United States Patent [19]

Ferreira

[11] Patent Number: 5,553,991
[45] Date of Patent: Sep. 10, 1996

[54] HEAVY DUTY IMPACT WRENCH CADDY

[76] Inventor: Armando Ferreira, 16343 Summershade Dr., La Mirada, Calif. 90638

[21] Appl. No.: 308,413

[22] Filed: Sep. 19, 1994

[51] Int. Cl.$^6$ ........................................ B25B 17/00
[52] U.S. Cl. .................... 414/680; 81/57.41; 81/462; 280/47.34; 280/79.6
[58] Field of Search ................... 414/680; 194/904; 81/57.41, 462; 280/47.34, 62, 79.4, 79.6

[56] References Cited

U.S. PATENT DOCUMENTS

| | | | |
|---|---|---|---|
| 3,540,753 | 11/1970 | Hanson | 280/47.34 |
| 5,125,460 | 6/1992 | Behrens | 280/638 |
| 5,263,392 | 11/1993 | Schoen | 81/462 |
| 5,362,194 | 11/1994 | Kassebaum | 280/79.4 |

FOREIGN PATENT DOCUMENTS

| | | | |
|---|---|---|---|
| 2834369 | 2/1980 | Germany | 81/57.41 |
| 626592 | 10/1961 | Italy | 81/57.41 |
| 564953 | 7/1977 | U.S.S.R. | 81/57.41 |
| 2064394 | 6/1981 | United Kingdom | 81/57.41 |

OTHER PUBLICATIONS

Myers Catolog No. 335, May 15–Jun. 30, 1994, Cover+1 page, "Truck Tire Work Station," #52–080.

*Primary Examiner*—Karen B. Merritt
*Assistant Examiner*—Gregory A. Morse
*Attorney, Agent, or Firm*—Charles H. Thomas

[57] ABSTRACT

A mobile impact wrench carriage is provided for holding a heavy duty impact wrench aloft for operation in a generally horizontal disposition. The impact wrench caddy of the invention has particular application to the removal and reinstallation of lug nuts holding a large vehicle wheel to a vehicle wheel mount. The impact wrench carriage employs a platform supported by at least three casters and a hoist mounted on the platform. The hoist preferably employs a boom having a first end coupled to the platform by way of an upright stanchion and an opposite, cantilevered end that is vertically movable relative to the platform. An impact wrench carrier is secured to the cantilevered end of the boom. The impact wrench carrier preferably is in the form of a cable forming a noose that captures and suspends the impact wrench. A biasing mechanism, such as a shock absorber, urges the cantilevered end of the boom upwardly. The biasing mechanism counterbalances the weight of the impact wrench to minimize the manual effort that is required to maneuver the impact wrench into proper position during its operation. The caster supports allow the platform, and thus the impact wrench, to be moved laterally in any direction.

20 Claims, 3 Drawing Sheets

HEAVY DUTY IMPACT WRENCH CADDY

BACKGROUND OF THE INVENTION

1. Field of the Invention

The present invention relates to an impact wrench caddy or mobile impact wrench carrier used for supporting a heavy duty impact wrench for operation in a generally horizontal orientation.

2. Description of the Prior Art

In the trucking industry and in other industries that involve the operation and maintenance of heavy duty vehicles equipped with very large tires, heavy impact wrenches are utilized to remove and install the lug nuts that are used to hold the tire frames onto the vehicle wheel mounts. The impact wrench is pneumatically driven by a high-pressure pneumatic source.

An impact wrench of the type utilized for removing and reinstalling lug nuts on heavy duty vehicles typically weighs about thirty-five pounds, excluding the weight of the trailing pneumatic hoses and socket attachments coupled thereto. In order to change a vehicle tire on a heavy duty vehicle, such as an eighteen wheel truck, the portion of the truck bearing the wheel first must be jacked up. This lifts the wheel off the ground. The person changing the tire must then lift the impact wrench, hold it in a generally horizontal position, and operate the impact wrench so as to remove the lug nuts from the tire. In conventional practice these heavy duty impact wrenches are usually lifted manually, typically by a single person.

Due to the heavy weight of the impact wrench, considerable strength is required to lift it and also to operate it in a generally horizontal orientation. In the large vehicles with which impact wrenches of this type are utilized the highest lug nut of a vehicle tire may be as much as three feet above the surface when the vehicle wheel is elevated for removal of the tire. Thus, an individual operating the impact wrench must lift and hold the impact wrench at approximately waist level to operate it so as to remove or reinstall the highest lug nuts holding the tire frame to the wheel support. Furthermore, the impact wrench operator must either bend over or crouch down to remove the lower lug nuts while holding and operating the impact wrench in a generally horizontal disposition.

It is extremely tiring for a person to operate an impact wrench in this manner. By manually holding the impact wrench in an elevated, generally horizontal position, and operating it in this position, a user's back is put under a considerable strain, thus leading to a significant likelihood of back injury. Many back injuries in fact do occur as a result of operation of a heavy duty impact wrench in this manner. These injuries cause not only human suffering, but also result in increased medical claims and insurance premiums for the employers involved. Furthermore, it is often difficult to hold the impact wrench aloft in this manner, and to control it accurately. Thus, a misguided impact wrench can damage the lug nuts and cause other injury.

SUMMARY OF THE INVENTION

The present invention involves a portable support for an impact wrench of the type used for changing large vehicle tires. According to the present invention a mobile support is provided which greatly facilitates the task of supporting an impact wrench for use in a horizontal orientation. The invention involves a cart mounted on large casters which are fully rotatable about vertical axes. The cart has a generally L-shaped configuration when viewed from above. The principal operating element of the cart is a pneumatically assisted boom. The boom is hinged at a fulcrum at one location on the cart and is supported at its center by a pneumatically loaded piston within a cylinder. The compressed gas in the cylinder will normally hold the boom in its fully elevated position.

At the end of the boom there is a wire cable, surrounded by a cushioning material, such as plastic or rubber, and looped to form a noose to receive the housing of an impact wrench. The pneumatic pressure in the piston is selected so as to largely counteract the weight of the impact wrench. The impact wrench can thereby be positioned in the noose and suspended from the boom. Since the weight of the impact wrench is largely offset by the counteracting force of the gas pressure in the cylinder the impact wrench can be moved vertically quite easily while being maintained in a horizontal disposition. Furthermore, due to the configuration of the support and the caster mountings employed, the cart is highly maneuverable laterally in all directions. As a consequence, a heavy duty impact wrench can be easily positioned in a horizontal disposition and operated so as to remove and reinstall lug nuts on the wheel of a heavy duty vehicle.

The cart also includes a pneumatic hose coupling with a quick disconnect fitting to receive a pressurized air supply. A pneumatic air duct on the cart is connected through a pipe to this coupling and includes one flexible hose section with a fitting that allows it to operate the impact wrench. This is helpful since the mobile cart allows the inflating hose to be moved into position with less difficulty than would be necessary to drag a hose from a remote pneumatic source. Another flexible air hose connected to the air duct can be coupled to a pneumatic jack to lift the chassis of the truck. The cart also has a pneumatic gauge and a further hose coupling with a fitting that allows a user to determine pneumatic pressure within the tire and to inflate the tire. The cart is also equipped with various receptacles and bins for holding lubricants, lug nuts, tire tools, socket attachments for the impact wrench, air coupling attachments, etc.

In one broad aspect the present invention may be considered to be an impact caddy comprising a mobile cart, an impact wrench coupling for carrying an impact wrench, a hoist for lifting the impact wrench coupling anchored to the cart, and a biasing mechanism interposed between the cart and the impact wrench coupling so as to exert an upward force thereon.

In a preferred embodiment of the invention the cart is supported by a plurality of casters and the hoist includes a boom having an anchored end joined to an upright stanchion that is mounted on the cart. The stanchion supports the boom at the anchored end thereof. The anchored end of the boom is joined to the stanchion at a fulcrum. The opposite end of the boom is cantilevered and is joined to the impact wrench coupling. The impact wrench coupling is formed of a cable of adjustable length with a noose at the hanging end thereof for capturing an impact wrench. Typically the noose is looped about the handgrip that is normally provided on the side of the case of an impact wrench so that the impact wrench can be suspended by its side handgrip from the noose. The noose thereby captures the impact wrench so that it hangs suspended from the cantilevered end of the boom.

In the preferred embodiment of the invention the biasing mechanism is comprised of a pneumatic spring. The biasing mechanism may take he form of a shock absorber which includes a cylinder, and a piston located within the cylinder and which is movable in longitudinal reciprocation relative thereto. The compressed gas in the spring is located within the cylinder and exerts a force on the piston ending to extend the piston rod from the piston and thereby elevate the cantilevered end of the boom.

Preferably the cart will be formed of a platform or mobile base constructed of a pair of linearly extending, horizontally disposed frame members which intersect each other at an angle of between about sixty-five and ninety degrees. One of the frame members of the platform is preferably a little over three feet in length, while the other frame member is preferably a little over two feet in length. The wheels of the casters supporting the frame members are relatively large and are at least three inches in diameter. In the preferred embodiment of the invention the caster wheels are rubber tired wheels having an outer diameter of about five inches. With this configuration the cart has good lateral stability and is also highly maneuverable into position to remove and reinstall lug nuts on a vehicle wheel.

Preferably the cart of the impact wrench caddy includes a compressed air duct having a pneumatic inlet coupling for connection to a compressed air source and a hose segment with a pneumatic outlet coupling for connection to the pneumatic coupling of a heavy duty impact wrench. Both the inlet and outlet couplings are preferably of the quick disconnect, bayonet type that are normally employed in pneumatic hose connections. The impact wrench caddy also preferably includes a flexible pneumatic hose that is attached to another pneumatic outlet coupling of the compressed air duct. This flexible pneumatic hose is advantageously provided with fittings that allow it to be connected to a pneumatic vehicle jack and also to the valve stem of a vehicle tire. The cart also includes a pneumatic pressure gauge in line with the compressed air duct.

The use of a pneumatic duct, hose segment, and the fittings described allows the cart to be rolled on its casters into position next to a truck, the tire of which is to be changed. The large casters on the cart aid in dragging the heavy, pneumatic hose line from a storage location near an air compressor or compressed air reservoir, and thus relieve the operator of this burden as well.

The provision of a compressed air duct and hose segment on the cart also serves to introduce a certain amount of slack into the pneumatic line to which the impact wrench is connected. That is, the structure of the cart is interposed between the heavy pneumatic line emanating from the compressed air source and the impact wrench itself. The flexible pneumatic hose segment on the cart is therefore not under any significant tension, and can be easily coupled to the pneumatic input of the impact wrench. Furthermore, due to the slack provided by the pneumatic hose segment on the cart, the impact wrench can be maneuvered adroitly and with far less difficulty than is the case when it is attached directly to the heavy hose that extends to the compressed air supply.

The cart of the impact wrench caddy is also advantageously provided with a plurality of storage receptacles. These storage receptacles may take the form of tubular sockets or sleeve-like containers within which cans of lubricant and the ends of tire irons, jack handles and other long, thin accessories can be placed. In addition, the storage receptacles may include a plurality of drawers for conveniently storing pneumatic fittings and lug nuts, racks for storing impact wrench sockets, and a tray for holding tools useful in operating a heavy duty impact wrench and in changing vehicle tires.

In another broad aspect the invention may be considered to be a mobile impact wrench carriage comprising a platform and rollers supporting the platform for translational movement across a supporting surface. A hoist is mounted upon the platform and has an impact wrench carrier that is vertically movable relative to the platform. The carriage also has a mechanism for urging the impact wrench carrier vertically upwardly. This mechanism is preferably a shock absorber.

In still another broad aspect the invention may be considered to be a mobile impact wrench mount comprising a trolley, casters supporting the trolley, a boom mounted on the trolley and having a first end coupled to the trolley and an opposite cantilevered end that is vertically movable relative to the trolley, an impact wrench carrier secured to the cantilevered end of the boom, and a biasing mechanism hat urges the cantilevered end of the boom upwardly.

The invention may be described with greater clarity and particularity by reference to the accompanying drawings.

DESCRIPTION OF THE EMBODIMENT

Figure 1:
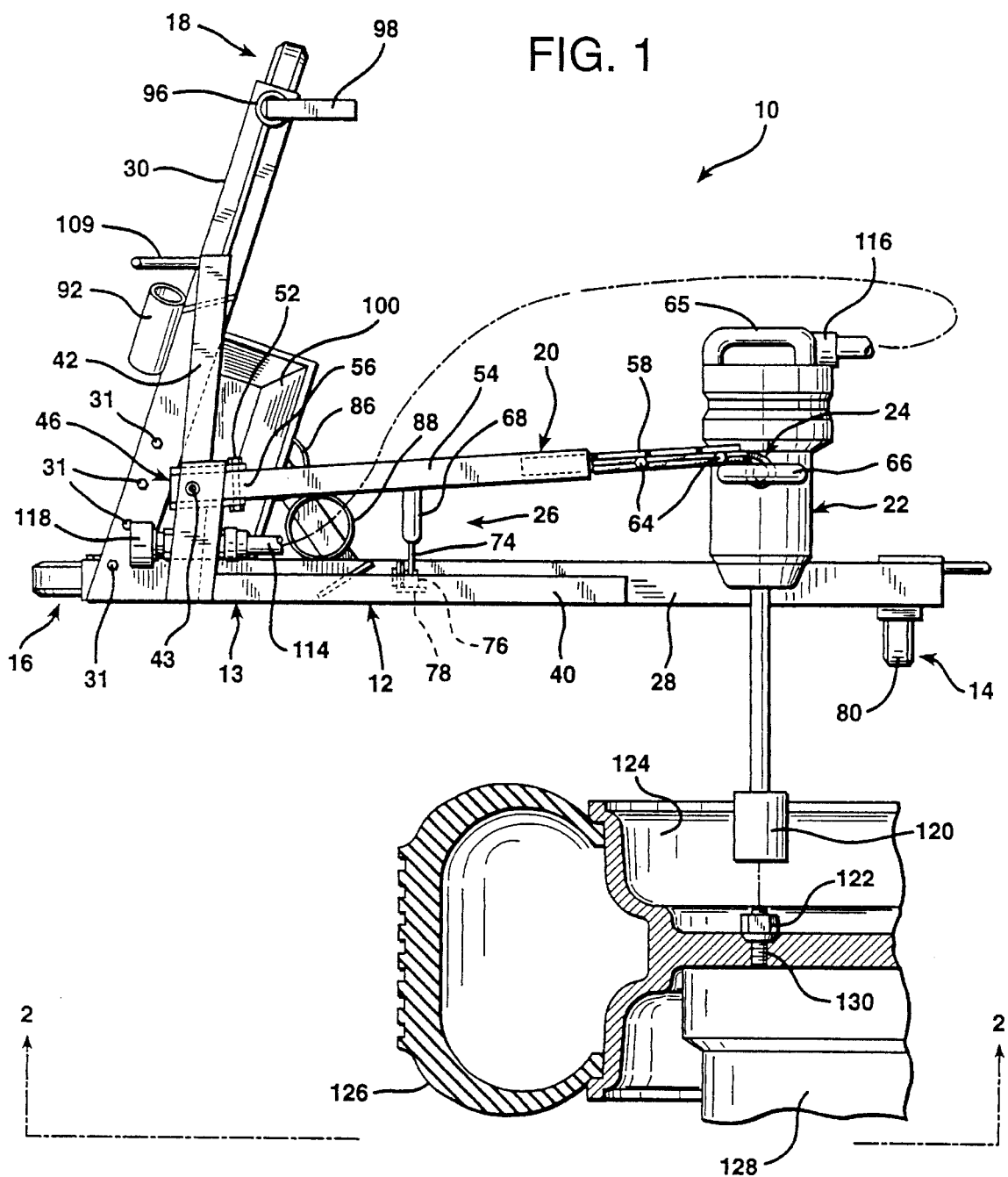
FIG. 1 is a top plan view of a mobile impact wrench caddy according to the invention shown in use with a portion of a vehicle tire which is illustrated in section.
Figure 2:
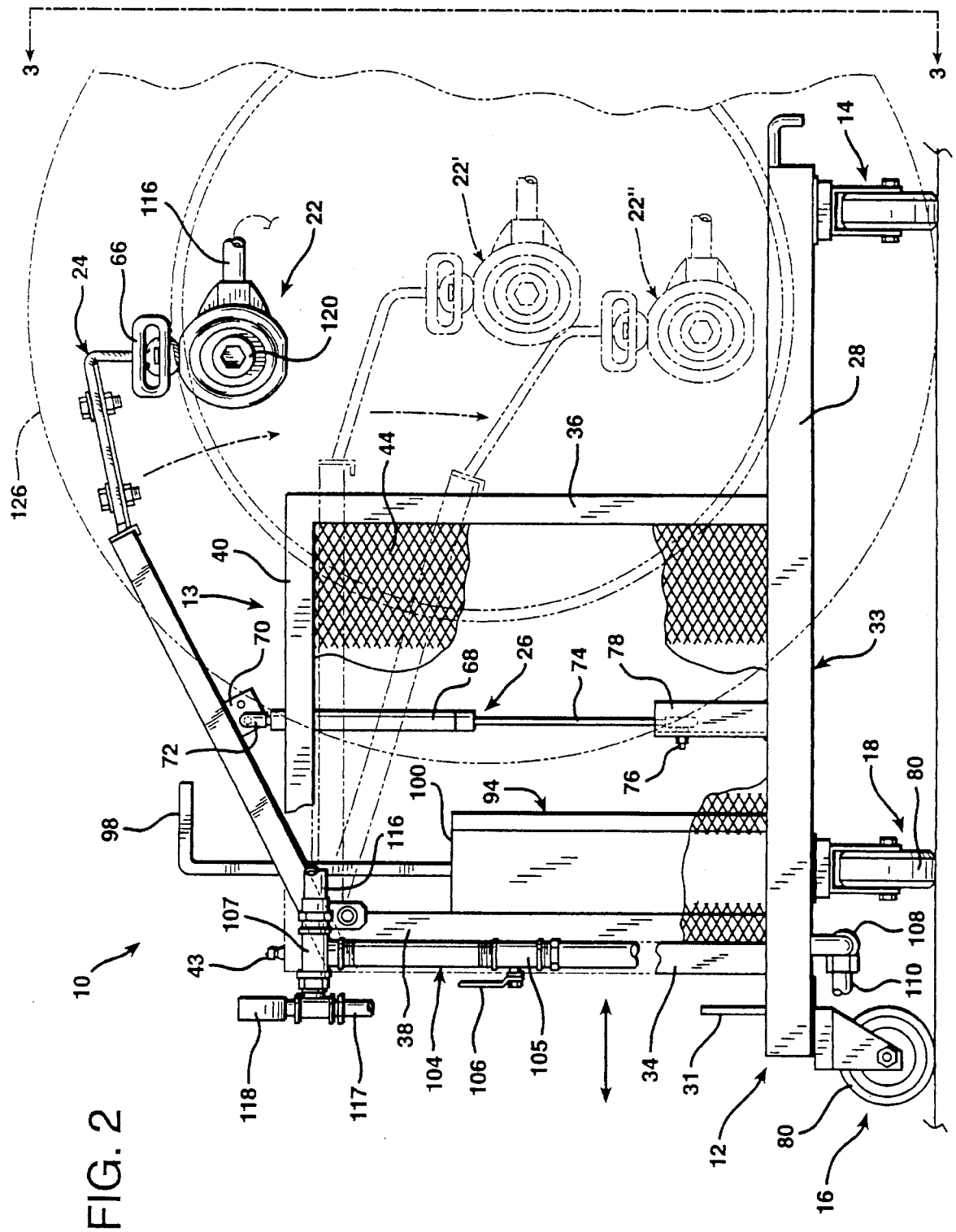
FIG. 2 is an elevational view, partially broken away, taken along the lines 2—2 of FIG. 1 in which the tire is shown in phantom.
Figure 3:
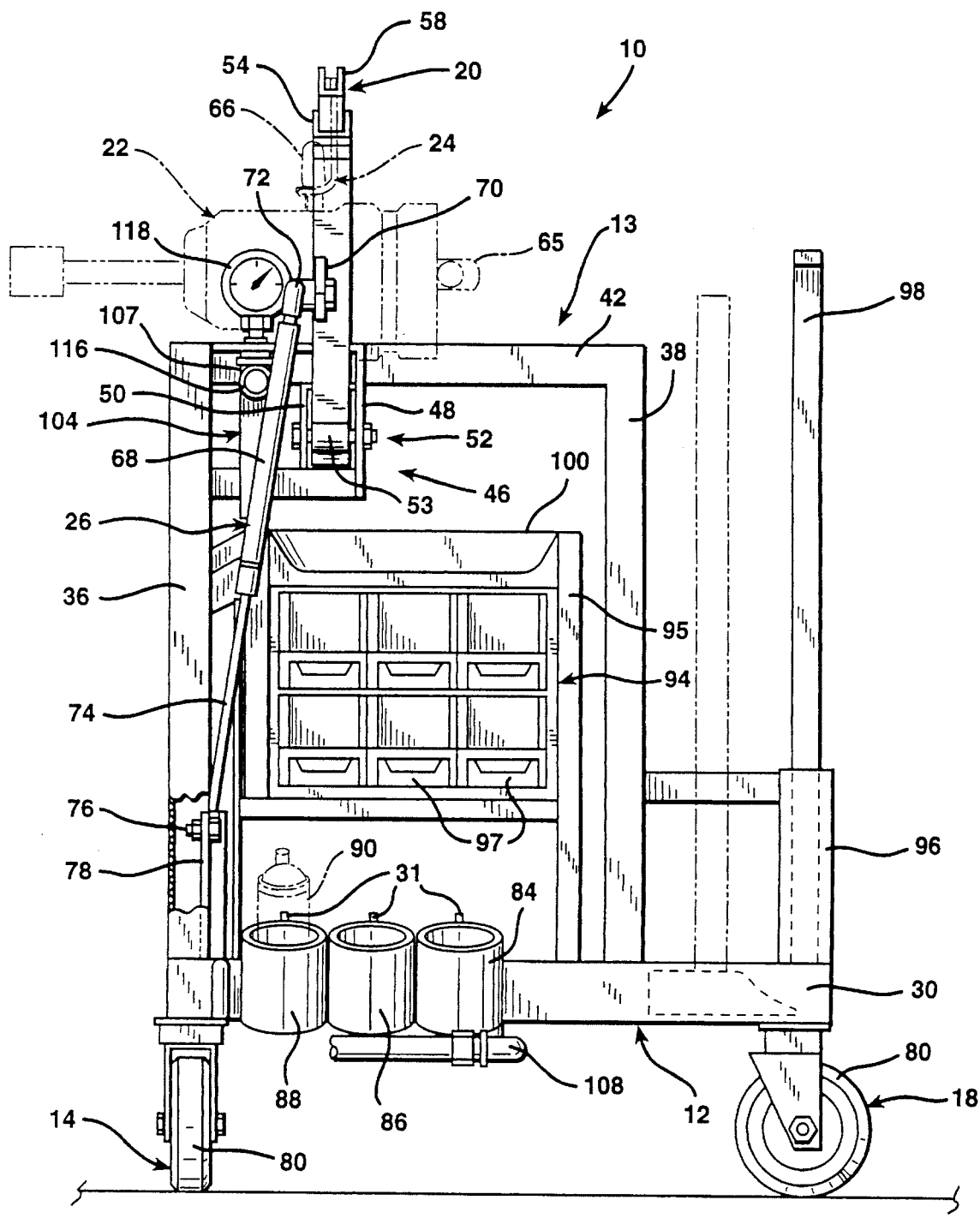
FIG. 3 is an elevational view taken along the lines 3—3 of FIG. 2.

FIGS. 1 through 3 illustrate an impact wrench caddy 10 that is formed of a cart 12. The cart 12 may also be considered to be a platform or trolley. The cart 12 is supported by three casters 14, 16, and 18. A hoist 20 is mounted upon the cart 12 and is used for lifting a heavy duty, pneumatically powered impact wrench 22 by means of an impact wrench coupling 24. The impact wrench coupling 24 is a plastic-coated cable of adjustable length that is looped to form a noose that captures and carries the impact wrench 22. The impact wrench caddy 10 is also comprised of a biasing shock absorber 26 that is interposed between the cart 12 and the impact wrench coupling 24 so as to exert an upward force on the impact wrench coupling 24.

The a platform 12 includes an elongated, horizontally disposed frame member 28 constructed of tubular steel stock about thirty-seven and a half inches in length land about two inches square. The platform 12 also includes another horizontally disposed, elongated two inch square tubular steel frame member 30 welded to the frame member 28 at an angle of about seventy-three degrees. The tubular steel frame member 30 is about twenty-five and a half inches in length. Several pins 31 about four inches in length are welded to the top of the frame member 30 near its junction with the frame member 28. The pins 31 project vertically upwardly from the frame member 30 and are provided for storing different sockets for the impact wrench 22. The pins 31 project upwardly through the hollow centers of any sockets placed thereon.

Atop the platform 12 there is an upright stanchion 13 which is also formed of square tubular steel upright members 34, 36, and 38 joined at their upper extremities by horizontally disposed cross members 40 and 42. The square tubular steel members 34–42 form the stanchion 13 in the shape of two upright open rectangular frames which intersect each other at an angle of about 85 degrees. The tubular steel members 34-42 are welded together and to the lower elongated frame members 28 and 30 as illustrated. The cross member 40 is about 18 inches in length and resides vertically above and parallel to the lower frame member 28. A vertically oriented protective screen mesh 44 is secured across one of the open rectangular frames between the stanchion members 34, 36, and 40 and across a portion of the top of the frame member 28. The screen mesh 44 serves as protection from a wheel clamp which can be pushed out suddenly from the wheel when removed from the wheel hub.

The upright stanchion structure 13 also includes a mounting bracket 46 formed of steel members in the upper corner proximate the intersection of the cross members 40 and 42. The bracket 46 has an inverted U-shaped configuration and is rotatably attached at its top to the cross member 42 by a vertical hinge pin 43. The bracket 46 has a pair of downwardly depending vertically oriented plates 48 and 50 that serve as a pair of axle mounting ears. An axle bolt assembly 52 passes horizontally through the mounting ears formed by the plates 48 and 50 near their lower extremities. The bolt assembly 52 serves as a fulcrum for the hoist 20. The vertical hinge pin 43 allows the boom 20 to be pushed laterally over a distance of about four inches.

Figure 4:
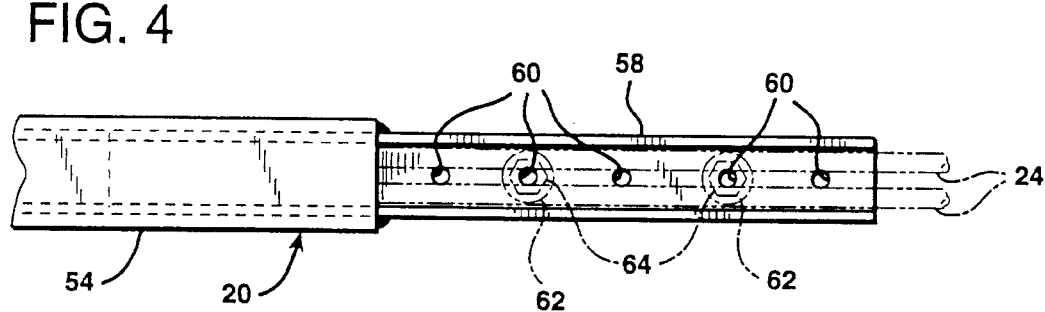
FIG. 4 is a plan detail of the cantilevered end of he boom shown in FIG. 1.

The hoist 20 is configured as an elongated boom and includes a first member 54 formed of two inch square tubular steel stock having an anchoring end 56. A transverse, horizontally oriented sleeve 53 is welded to the underside of the boom 20 at the anchoring end 56 thereof. The axle bolt assembly 52 extends through the sleeve 53 to form a hinge connection between the boom 20 and the stanchion 13. The tubular steel member 54 is about twenty-two and a half inches in length. At the opposite, cantilevered end of the boom 20 there is a steel angle section 58 telescopically inserted into the opening in the end of the member 54 remote from the axle bolt assembly 52. The tubular steel member 54 and the angle member 58 are welded together, as best illustrated in FIG. 4.

The impact wrench coupling 24 is formed of a length of plastic-coated steel cable, the ends of which reside in close proximity to each other in mutual parallel alignment. The ends of the cable are cradled within the angle member 58 and are supported from beneath by the angle member 58. The ends of the cable 24 are directed toward the tubular steel member 54 and extend along the greater part of the length of he angle member 58 as best illustrated in FIG. 4.

The angle member 58 is perforated at regular intervals by vertical openings 60 therethrough. The ends of the cable 24 pass alongside the openings 60. The cable ends are clamped against the angle member 58 by washers indicated at 62 and are secured by a pair of Dolts 64. The bolts 64 are inserted through any appropriate selected apertures 60 and tightened to clamp the ends of the cable 24 against the legs of the angle member 58. The Dolts 64 and the ends of the cable 24 are shown only in phantom in FIG. 4 in order to allow illustration of the longitudinally spaced openings 60.

The central portion of the cable 24 forms a noose that is of variable size and length. As illustrated, the heavy duty impact wrench 22 is equipped with a rear handle 65 and a side handle 66 by means of which an operator is able to wield the impact wrench 22 while operating it. The noose formed by the cable 24 is looped about the base of the side handle 66 that projects radially outwardly from the casing of the impact wrench 22. The impact wrench 22 is hereby captured by and hangs suspended from the loop of the noose formed by the cable 24.

Initially, the bolts 64 are loosened to allow the cable 24 to be formed into a loop that passes around the base of the side handle 66 of the impact wrench 22. The ends of the cable 24 are then passed back through the loop to create a noose about the base of the side handle 66. Once the ends of the cable 24 have been drawn back through the loop the noose is cinched snugly about he base of the side handle 66. The noose is snugged up against the base of the handle 66 by pulling the ends of the cable 24 longitudinally toward the tubular member 54 of the boom 20. With the cable 24 cinched snugly about the base of the side handle 66 of the impact wrench 22, the impact wrench 22 will hang suspended from the cantilevered end of the boom 20. The noose captures the base of the side handle 66 so that the side handle 66 cannot slip out of it.

The vertical lengths of the portions of the ends of the cable 24 that hang downwardly from the free end of the angle member 58 may be varied by loosening the bolts 64 to allow longitudinal movement of the ends of the plastic coated cable 24 along the length of he angle member 58. Different operators will prefer a greater or lesser portion of the cable 24 to hang from the free end of the angle member 58.

The biasing shock absorber 26 includes a hollow cylinder 68 that is secured to a bracket 70 by a clevis joint 72 to allow relative rotational movement between the cylinder 68 and the boom 20. The shock absorber 26 also includes a piston disposed within the confines of the cylinder 68 and connected to a piston rod 74 that extends downwardly from the cylinder 68. The lower extremity of the piston rod 74 terminates in a hinge connection that is coupled by a pivot hinge pin 76 to an angle section 78 that is welded at its base to extend vertically upwardly from the frame member 28.

As with conventional shock absorbers, the shock absorber 26 is charged with compressed gas that biases the piston rod 74 toward an extended position, outwardly away from the clevis connection 72 at the base of the cylinder 68. The piston rod 74 is thereby biased toward a position extended linearly out from the cylinder 68. Since the cylinder 68 is connected to the boom 20 through the clevis connection 72 and the piston rod 74 is connected to the cart 12 through the hinge pin 76, the spring bias of the shock absorber 26 exerts an upward force on the boom 28, and thus also against the impact wrench coupling cable 24.

The casters 14 and 16 are mounted by swivel connections to rotate about vertical axes at the opposite longitudinal extremities of the tubular frame member 28. The caster 18 is likewise mounted by a swivel connection for complete rotation about a vertical axis at the extremity of the frame member 30 remote from the frame member 28. The casters 14, 16, and 18 are laterally separated a sufficient distance to provide a very stable, three-point, mobile base support for the cart 12. The casters 14, 16, and 18 all include rubber tired wheels 80 that are five inches in diameter. The wheels 80 are thus large enough so that they do not catch on small pebbles or in the cracks between sections of concrete paving.

The cart 12 is also equipped with other features. The cart 12 is constructed with a diagonal, transverse steel strap 82 welded or otherwise secured to the undersides of the frame members 28 and 30. The upper surface of the strap 82 is canted at an angle relative to horizontal. The strap 82 serves not only to enhance the structural rigidity of the cart 12, but also to form the bottom supports of three inwardly inclined, cylindrical containers 84, 86, and 88. The containers 84, 86, and 88 are employed to hold accessories useful in operating the impact wrench 22 and in changing vehicle tires. For example, a can of lubricant 90 is illustrated as residing within the cylindrical receptacle 88 in FIG. 3.

Another tubular storage receptacle 92 is welded to the side of the stanchion frame member 30. The receptacle 92 is closed at its bottom end and is inclined upwardly at an angle. The storage receptacle 92 is best illustrated in FIG. 1 and may be used for holding a tire iron, crowbar, or jack handle.

The cart 12 also includes an upright tubular, cylindrical, sleeve-like receptacle 96 adapted to receive and support a tire iron 98 as best illustrated in FIGS. 1 and 2. The receptacle 96 is located at the extremity of the horizontally disposed frame member 30. The receptacle 96 is welded to the top surface of the frame member 30.

As illustrated in FIG. 3, a large, box-shaped chest of drawers 94 is mounted on the cart 12 by upright tubular steel posts 95 that are welded to the horizontally disposed frame members 28 and 30. The chest 94 has an array of horizontally sliding storage trays or drawers 97. The storage trays 97 provide a convenient means for storing pneumatic fittings, lug nuts, and other small tools and parts. A shallow generally trapezoidal-shaped tray 100 is mounted atop the chest of drawers 94. The tray 100 is convenient for storing many different types of small hand tools used in the operation of the impact wrench 22 and for changing a vehicle tire.

The cart 12 is also equipped with a vertically oriented compressed air duct best illustrated at 104 in Fig. 2. The compressed air duct 104 has a valve 105 therein that may be opened and closed by means of the valve handle 106. The compressed air duct 104 has a plumbing T-connector 107 at its upper extremity. The connector 107 is welded to the underside of the stanchion cross member 42.

At its lowest extremity the compressed air duct 104 has an elbow 108 that is welded to a bracket at the underside of the frame member 30. The elbow 108 is provided with a quick disconnect inlet coupling to which the mating fitting of a compressed air supply hose 110 leading from a compressed air source is connected. A length of flexible hose is connected between the elbow 108 and the valve 105, while a straight length of galvanized steel pipe extends upwardly from the valve 105 to an inlet leg of the T-connector 107.

One outlet leg of the T-connector 107 is joined to another pneumatic flexible pneumatic hose segment 114. The hose segment 114 is equipped with a quick disconnect fitting 116 suitable for connection to the impact wrench 22. The other outlet leg of the T-connector 107 is connected to another length of flexible hose 117 that is used to supply compressed air to a pneumatically operated vehicle jack. Alternatively the flexible hose 117 may also be used for supplying compressed air to a tire inflation valve. The stanchion 13 is provided with a hook 109 upon which the hose 117 may be coiled and hung. The end fittings for the flexible hose 117 are conveniently stored in the rays 97 of the chest of drawers 94 when not in use.

A pneumatic pressure gauge 118 is coupled in line with the compressed air duct 104. The pneumatic pressure gauge 118 allows the operator to monitor air pressure both to the pneumatic impact wrench 22 and also to the valve stem of a tire when inflating a tire and to a pneumatic jack when operating the jack.

FIGS. 1 through 3 illustrate the operation of the mobile impact wrench caddy 10. The impact wrench 22 is first fitted with an appropriate socket 120 and the cable 24 is looped about the side handle 66 of the impact wrench 22 and secured to the boom 20 as previously described. The pneumatic gas pressure within the shock absorber 26 is selected so as to approximately balance the weight of the impact wrench 22 when the impact wrench 22 is held suspended from the cable 24 as illustrated. That is, the compressed gas in the shock absorber 26 will bias the boom 20 upwardly to the position shown in solid lines in FIG. 2 with a force that applies a counterclockwise moment to the boom 20. When the impact wrench 22 is suspended from the boom 20, the rotational moment applied by the shock absorber 26 is approximately equal to hat exerted by the clockwise force exerted on the cantilevered end of the boom 20 by the weight of the impact wrench 22.

When the piston rod 74 of the shock absorber 26 is in its fully extended position in as illustrated in FIG. 2, the socket 120 of the impact wrench 22 is held at an elevation approximately equal to the height of the highest lug nut 122 that holds a tire frame 124 of a tire 126 to the wheel mount 128, depicted in FIG. 1. With very little effort the operator is able to maneuver the impact wrench 22 and the socket 120 mounted thereon into position to untighten and retighten the lug nuts 122 to bolt and unbolt the tire frame 124 relative to the wheel mount 128. Since the casters 14, 16, and 18 are completely rotatable about their vertical axes of connection to the cart 12, the cart 12 can be easily maneuvered as required so that the socket 120 engages the lug nut 122 precisely along the axis of the mounting stud 130.

The cable 24 forming the suspension noose can easily be twisted by the operator using the side handle 66 and rear handle 65 of the impact wrench 22 to rotate the impact wrench 22 about the vertical axis lying along the vertically hanging length of the cable 24 above the side handle 66 of the impact wrench 22 as required. The impact wrench 22 can easily be shifted horizontally by rolling the cart 12 as necessary on the casters 14, 16, and 18.

To accommodate the differences in vertical level of the various lug nuts 122, the operator need merely apply a downward, manual force on the impact wrench 22. Only a slight force is required to overcome the counterbiasing force of the compressed gas within the shock absorber 26. With a slight manually applied downward force on the cantilevered end of the boom 20, the gas within the shock absorber 26 is further compressed so that the impact wrench 22 can be lowered to an intermediate position indicated in phantom at 22' in FIG. 2, and to an even lower position indicted in phantom at 22" in that same drawing figure. In this way the impact wrench 22 can be maneuvered so that the socket 120 thereof accurately and coaxially engages all of the lug nuts 122. The tire frame 124 can then be removed from the tire mount 128 and reinstalled quickly and easily while greatly reducing back strain to the operator.

As is evident from the drawings, the counterbalancing arrangement provided for the impact wrench 22 allows a heavy duty impact wrench to be utilized by an operator with far less physical strength, stress, and strain than is necessary to utilize an impact wrench in the conventional manner. The casters 14, 16, and 18, the counterbalanced boom 20, and the flexible impact wrench coupling provided by the cable 24 all allow the orientation, lateral position, and level of elevation of the impact wrench 22 to be precisely adjusted with very little difficulty and with a minimum of effort.

Undoubtedly, numerous variations and modifications of the invention will become readily apparent to those familiar with the use of impact wrenches and other heavy duty tools that must be held aloft and maneuvered laterally for use. For example, a hoist having a vertically reciprocal suspension member could be employed in place of the rotatably mounted boom illustrated in the drawings. Also, a gantry system could likewise be employed as an alternative to the boom shown. Furthermore, a coil spring or hydraulic biasing arrangement, or a gravity counterbalancing system could be employed to form the biasing mechanism interposed between the cart and the impact wrench coupling. Numerous other modifications and alterations of the invention will likewise become apparent to those of normal mechanical skill. Accordingly, the scope of the invention should not be construed as limited to the specific embodiment thereof depicted and described herein.

I claim:

1. An impact wrench caddy comprising:
a mobile cart, an impact wrench coupling for carrying an impact wrench in a horizontal disposition and which permits rotation of said impact wrench about a vertical axis, a hoist for lifting said impact wrench coupling anchored to said cart, and a biasing mechanism interposed between said cart and said impact wrench coupling so as to exert an upward force thereon.

2. An impact wrench caddy according to claim 1 wherein said hoist includes a boom having an anchored end joined at a fulcrum to said cart and a cantilevered end joined to said impact wrench coupling.

3. An impact wrench caddy according to claim 2 further comprising an upright stanchion mounted on said cart and supporting said boom at said anchored end thereof.

4. An impact wrench caddy according to claim 1 wherein said biasing mechanism is comprised of compressed gas within a cylinder.

5. An impact wrench caddy according to claim 4 wherein said biasing means is further comprised of a cylinder, a piston located within said cylinder and movable in longitudinal reciprocation relative thereto, and said compressed gas is located within said cylinder and exerts a force upon said piston.

6. An impact wrench caddy according to claim 1 wherein said impact wrench coupling is comprised of a suspended element of adjustable length for capturing an impact wrench.

7. An impact wrench caddy according to claim 1 wherein said biasing mechanism is comprised of a shock absorber.

8. An impact wrench caddy according to claim 1 further comprising a plurality of casters supporting said cart for movement across an underlying surface.

9. An impact wrench caddy according to claim 1 further comprising a compressed air duct having a pneumatic inlet coupling for connection to a compressed air source and a pneumatic outlet coupling for connection to an impact wrench, a pneumatic outlet coupling for connection to a pneumatic jack, and a pneumatic pressure gauge in line with said compressed air duct.

10. An impact wrench caddy according to claim 1 further comprising a plurality of storage receptacles.

11. A mobile impact wrench carriage comprising:
a platform, rollers supporting said platform for translational movement across a supporting surface, a hoist mounted upon said platform and having an impact wrench carrier that is vertically movable relative to said platform and which suspends an impact wrench for operation in a horizontal disposition and which is rotatable about a vertical axis, and a mechanism for urging said impact wrench carrier vertically upwardly.

12. An impact wrench carriage according to claim 11 wherein said hoist is comprised of a boom that suspends said impact wrench carrier therefrom in cantilevered fashion.

13. An impact wrench carriage according to claim 12 wherein said impact wrench carrier is comprised of a cable suspended from said boom.

14. A mobile impact wrench carriage according to claim 11 wherein said rollers are comprised of at least three casters.

15. An impact wrench carriage according to claim 14 wherein said casters have wheels that are at least three inches in diameter.

16. A mobile impact wrench carriage according to claim 11 wherein said mechanism for urging said impact wrench carrier vertically upwardly is comprised of a shock absorber.

17. A mobile impact wrench carriage according to claim 11 wherein said platform is comprised of a pair of linearly extending, horizontally disposed frame members joined to each other at an acute angle.

18. A mobile impact wrench carrier according to claim 11 further comprising a compressed air duct mounted on said platform and having pneumatic inlet and pneumatic outlet couplings thereto, and at least one flexible pneumatic hose segment attached to said pneumatic outlet coupling and having at least one pneumatic outlet fitting.

19. A mobile impact wrench mount comprising:
a trolley, casters supporting said trolley, a boom mounted on said trolley and having a first end coupled to said trolley and an opposite cantilevered end that is vertically movable relative to said trolley, an impact wrench carrier secured to said cantilevered end of said boom and carrying an impact wrench suspended therefrom in a horizontal disposition and so as to permit rotation of said impact wrench about a vertical axis, and a biasing mechanism that urges said cantilevered end of said boom upwardly.

20. A mobile impact wrench mount according to claim 19 wherein said biasing mechanism is comprised of compressed gas acting within a cylinder.

* * * * *